United States Patent [19]

Eltoukhy et al.

[11] Patent Number: 5,674,582
[45] Date of Patent: Oct. 7, 1997

[54] MAGNETIC DISK HAVING ENHANCED ZONE LUBRICATION

[75] Inventors: Atef H. Eltoukhy, Saratoga; Hamid R. Samani, Albany; Edward F. Teng, Sunnyvale, all of Calif.

[73] Assignee: StorMedia, Inc., Santa Clara, Calif.

[21] Appl. No.: 363,725

[22] Filed: Dec. 23, 1994

[51] Int. Cl.⁶ .................................................. G11B 5/72
[52] U.S. Cl. ..................... 428/65.4; 428/156; 428/212; 428/336; 428/694 TP; 428/694 TF; 428/900; 427/130; 427/131; 360/135
[58] Field of Search ............................ 428/65.4, 156, 428/212, 336, 694 TP, 694 TF, 900; 427/130, 131; 360/135

[56] References Cited

U.S. PATENT DOCUMENTS

| | | | |
|---|---|---|---|
| 5,166,006 | 11/1992 | Lal et al. | 428/612 |
| 5,331,487 | 7/1994 | Gregory et al. | 360/97.02 |
| 5,447,746 | 9/1995 | Ishizaki et al. | 427/127 |

FOREIGN PATENT DOCUMENTS 02076122  3/1990  Japan.

*Primary Examiner*—Stevan A. Resan
*Attorney, Agent, or Firm*—Lahive & Cockfield, LLP

[57] ABSTRACT

Thin film disk media which is initially coated with lubricant from the ID or normal head landing area radially outwardly across the data zone. The initially applied lubricant area is thinned and buffed in the data area so as to provide a substantially reduced lubricant layer overlying the data zone characterized by markedly improved coefficient of friction characteristics in relation to what would have been produced without such lubricant removal and buffing.

2 Claims, 3 Drawing Sheets

MAGNETIC DISK HAVING ENHANCED ZONE LUBRICATION

GENERAL BACKGROUND OF INVENTION

This invention pertains to a unique enhancement of lubrication techniques applicable to the manufacture of thin film disk media.

The invention pragmatically carries forward recognized technology providing for overall disk coating with lubricant but such is uniquely followed by a novel lubricant thinning and buffing in the data zone. This thinning and buffing is confined to the data zone so as to leave the originally applied lubricant layer intact in the inner diameter, normal, head landing zone.

This arrangement uniquely retains desired lubrication and low coefficient of friction characteristics in the landing zone while limiting or impeding the development of "stiction" or head/disk engagement friction problems which have often resulted due to migration of lubricant from ID to OD zones of thin film disk media.

GENERAL STATE OF EXISTING AND PRIOR ART

A Nippon Sheet Glass patent discloses ID disk texturing along with the confinement of lubricant to this limited, ID textured zone. This patent is Takatsuki et al U.S. Pat. No. 4,996,622. The Takatsuki technique involves the application of lubricant to only the ID zone with a web, with excess lubricant in the ID area being removed by a cloth (col. 3, lines 15024).

While the Takatsuki et al patent U.S. Pat. No. 4,996,622 does disclose texturing in an ID zone, coupled with lubricant being confined to this ID zone, a substantial line of demarkation exists between the present concept and the disclosure of the Takatsuki et al patent.

The presently presented concept entails utilization of prior art lubricant application techniques, coupled with unique, subsequent lubricant removal steps which tend to eliminate the prospects for excessive lubricant build-up in the data area (OD area) of the disk. In this technique, the entire disk is coated with lubricant via conventional techniques such as complete disk dipping or spraying. Thereafter, a continuously replenished cleaning web or a roller containing a solvent removes lubricant from the OD area of the disk.

This removal of initially applied lubricant from the OD area will basically serve to eliminate most—but not all—lubricant from this area, while retaining a much reduced and somewhat buffered layer of lubricant radially outside the textured ID zone.

This unique approach tends to minimize stiction problems in the data area while leaving a minimal degree of lubricant in place.

Prior art in addition to Takatsuki et al includes patents such as the Kato U.S. Pat. No. 4,581,270 and Kato U.S. Pat. No. 4,721,640. Each of these Kato patents discloses a magnetic disk with an ID-located lubricant zone. The Kato patents relate to floppy disks wherein the ID-located lubricant zone is created by applying lubricant material to this annular area only and thus are much like the Takatsuki et al disclosure, but even less relevant to the invention herein put forth.

Certainly, the Kato concept is a far cry from the zoned lubricant invention herein presented which entails the application of lubricant to the entire surface of thin film media, following which material is removed from the OD areas so as to prevent excessive lubricant build-up in the data area during the high speed operation of the thin film disk.

Representative prior art which deals generally with either lubricant retention or diverse lubricant application may be summarized by the following compilation:

| Patent # | Inventor(s) | Assignee | General Subject Matter |
|---|---|---|---|
| 4,552,799 | Ryoke et al | Fuji Photo Film Col., Ltd. | Different lube on different tape areas |
| 4,664,963 | Sakai et al | Fujitsu Ltd. | Roughening to retain lube |
| 4,689,254 | Arndt et al | Verbatim Corp. | Buffing and calendaring entire disc |
| 4,786,544 | Saito | Hitachi Maxell, Ltd. | Matrix form of composite lubricant |
| 4,985,295 | Ishihara et al | Hitachi, Ltd. | Porosity to retain lube |
| 5,037,710 | Frew et al | Unisys Corp. | Chemical bonding |
| 5,138,506 | Beck et al | IBM | Continuous lube replacement |

With the general state of the prior art having been acknowledged and the fundamental thrust of the present invention having been delineated, it is appropriate at this juncture to overview or summarize the invention presented herein.

SUMMARY OF THE INVENTION

A principal aspect of the invention resides in a method concept for enhancing zone lubrication of thin film disk media, this method being delineated as follows:

In a method for manufacturing a magnetic media disk having
- a normal, head landing zone located in an inner diameter area, and
- a data zone located radially outwardly of the normal, head landing zone in an outer diameter area;

the improvement of this invention comprises:
- providing disparite coefficient of friction, surface characteristics for the outer surface of the media disk including
  - a relatively low coefficient of friction in the normal, head landing zone, and
  - a relatively higher coefficient of friction in the data zone;
- providing disparite thickness, lubricant zones overlying the media disk including
  - a relatively thicker layer of lubricant overlying the normal, head landing zone, and
  - a relatively thinner lubricant layer overlying the data zone;
- the coefficient of friction in lubricant in the relatively thinner lubricant layer overlying the data zone being less than would result from providing a uniform thickness of lubricant extending radially outwardly from the normal, head landing zone and having the same thickness as lubricant overlying the normal landing zone;
- forming the lubricant layer overlying the data zone by
  - initially applying a relatively thick lubricant layer overlying the data zone,
  - subjecting the initially applied, relatively thick lubricant layer overlying the data zone to
    - lubricant material removing and lubricant layer thinning, and
    - retention and buffing of a fractional thickness increment of the initially applied lubricant overlying the data zone;
- the retained and buffed, fractional lubricant increment enhancing corrosion resistance of the media disk and reducing the coefficient of friction in the data zone; and providing a lubricant transition zone having a lubricant thickness measured generally parallel to the axis of rotation of the media disk which generally decreases in a radially outward direction and extends between the relatively thicker layer of lubricant overlying the normal, head landing zone and the relatively thinner lubricant layer overlying the data zone.

One independently significant method aspect of the invention, of a more detailed nature, relates to specific thickness parameters of the thinned and buffed lubricant in the data zone. In this refined method, the thickness of lubricant in the data zone is maintained at not less than about fifteen angstroms and not more than about twenty angstroms.

A further specific refinement of the invention relates to the utilization of texturing in the normal, head landing zone, thereby tending to stabilize the location of the relatively thicker layer of lubricant overlying the normal, head landing zone.

Another independently significant method aspect of the invention resides in coefficient of friction improvements in the data zone expressed in method wherein:

the coefficient of friction of lubricant material in the retained and buffed fractional lubricant increment is reduced by at least about one-fourth of what the coefficient of friction therein would have been without the lubricant material thinning and buffing.

The foregoing independently significant aspects of the invention, when combined in the context of thin film disk media fabricated on smooth substrates such as glass, are particularly significant in a collective operating mode and serve effectively to reduce the coefficient of friction of lubricant material in the retained and buffed fractional lubricant increment by about one-half of what the coefficient of friction therein would have been without the aforesaid lubricant material thinning and buffing.

A further independently significant aspect of the invention resides in the production of an enhanced, zone lubricated, thin film disk media characterized as follows:

In a magnetic media disk having a normal, head landing zone located in an inner diameter area, and a data zone located radially outwardly of the normal, head landing zone in an outer diameter area;

the improvement of this invention comprising:

disparite coefficient of friction, surface characteristics provided for the outer surface of the media disk including a relatively low coefficient of friction in the normal, head landing zone, and a relatively higher coefficient of friction in the data zone;

disparite thickness, lubricant zones overlying the media disk including a relatively thicker layer of lubricant overlying the normal, head landing zone, and a relatively thinner lubricant layer overlying the data zone;

the coefficient of friction of lubricant in the relatively thinner lubricant layer overlying the data zone being less than would result from providing a uniform thickness of lubricant extending radially outwardly from the normal, head landing zone and having the same thickness as lubricant overlying the normal landing zone;

the lubricant layer overlying the data zone having been formed by initially applying a relatively thick lubricant layer overlying the data zone, subjecting this initially applied, relatively thick lubricant layer overlying the data zone to lubricant material removing and lubricant layer thinning, and retention and buffing of a fractional thickness increment of the initially applied lubricant overlying the data zone;

the retained and buffed, fractional lubricant increment enhancing corrosion resistance of the media disk and reducing the coefficient of friction in the data zone; and a lubricant transition zone having a lubricant thickness measured generally parallel to the axis of rotation of the media disk which generally decreases in a radially outward direction and extends between the relatively thicker layer of lubricant overlying the normal, head landing zone and the relatively thinner lubricant layer overlying the data zone.

Independently significant disk aspects of the invention which individually and collectively augment and supplement the basic disk invention may be expressed as follows:

First, a magnetic media disk refinement is presented wherein:

the thickness of lubricant in the data zone is not less than about fifteen angstroms and not more than about twenty angstroms.

Second, a magnetic media disk refinement is contemplated wherein:

the media disk is textured in the normal, head landing zone, this texturing being operable to tend to stabilize the location of the relatively thicker layer of lubricant overlying the normal, head landing zone.

Third, a magnetic media disk enhancement is presented wherein:

the coefficient of friction of lubricant material in the retained and buffed fractional lubricant increment does not exceed about three-fourths of what the coefficient of friction therein would have been without the lubricant material thinning and buffing.

Collectively, these refinements and enhancements applied to smooth disk substrates, such as glass, etc. result in an enhanced magnetic media disk wherein:

the thickness of lubricant in the data zone is not less than about fifteen angstroms and not more than about twenty angstroms;

the media disk is textured in the normal, head landing zone, this texturing being operable to tend to stabilize the location of the relatively thicker layer of lubricant overlying the normal, head landing zone; and the coefficient of friction of lubricant material in the retained and buffed fractional lubricant increment is about one-half of what the coefficient of friction therein would have been without the aforesaid lubricant material thinning and buffing.

With the invention having been basically summarized, reference will now be made to presently preferred embodiments illustrated by way of example in the appended drawings.

DRAWINGS

In the accompanying drawings:

FIG. 1 provides a schematic, top plan view of a thin film disk which has been provided with the enhanced zone lubrication of the present invention;

FIG. 2 schematically depicts the method elements employed in the fabrication of the FIG. 1 disk;

FIG. 3 provides a graphical indication of variations in lubricant thickness on the FIG. 1 disk, extending from the inner diameter, normal, head landing zone radially outwardly through a diminishing thickness lubricant transition zone to the relatively thinned, buffed, retained lubricant zone overlying the data area of the disk;

FIG. 4 provides a graphical indication of improved coefficient of friction characteristics resulting from the practice of the present invention and the FIG. 3 lubricant thickness variation zones; and FIG. 5 dramatically depicts the particularly enhanced coefficient of friction improvements resulting from the utilization of the present, enhanced zone lubrication concept with thin film disk media fabricated on smooth substrates such as glass, etc.

The drawings having been summarized, a detailed description of the presently preferred embodiments will now be undertaken.

DETAILED DESCRIPTION OF PRESENTLY PREFERRED EMBODIMENTS

In describing presently preferred embodiments, disk and method aspects of the invention will be initially overviewed, following which detailed parameter aspects of the invention will be reviewed.

Overview

Figure 1:
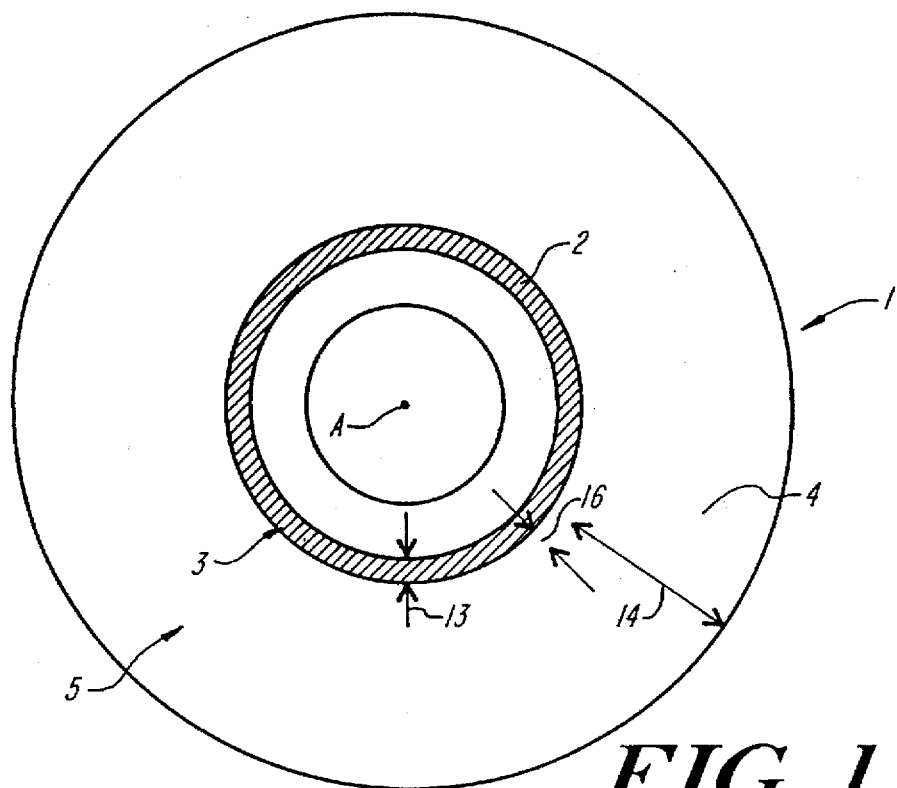

By reference to FIG. 1, it will be appreciated that basic disk aspects of the invention reside in the following combination concept:

As shown in FIG. 1, a representative magnetic media disk 1 includes a normal, head landing zone 2 located in an inner diameter area 3, and a data zone 4 located radially outwardly of the normal, head landing zone 2 in an outer diameter area 5.

Figure 3:
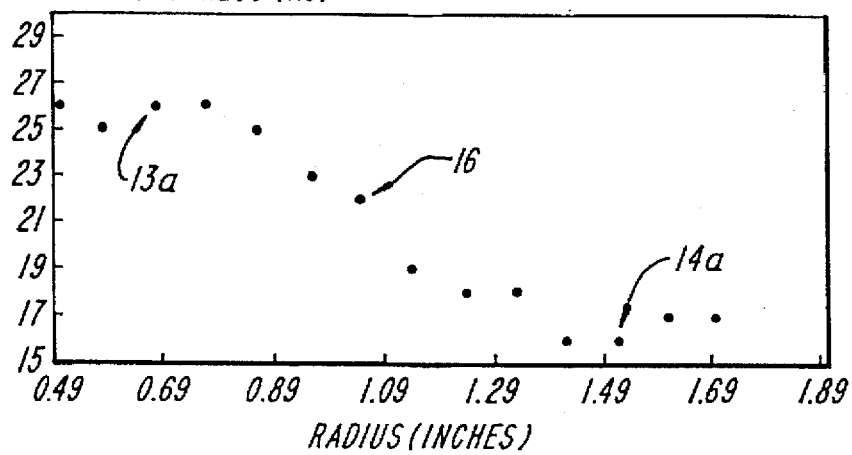
Figure 4:
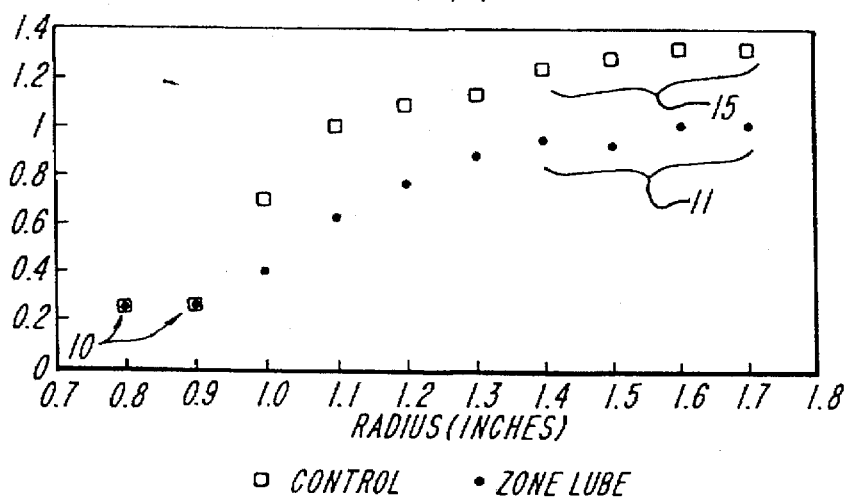
Figure 5:
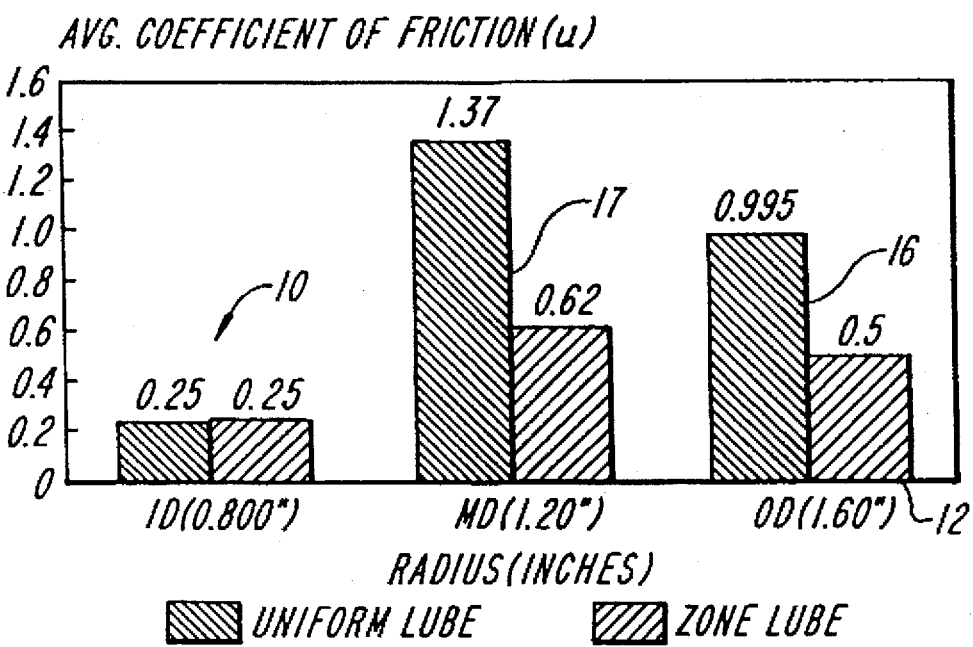

The improvement embodied in this disk 1 resides in:

disparite coefficient of friction, surface characteristics provided for the outer surface of the media disk including a relatively low coefficient of friction in the normal, head landing zone, such as about 0.25 as depicted in FIGS. 4 and 5 at 10, and a relatively higher coefficient of friction in the data zone such as about 0.9 shown in FIG. 4 at 11 and about 0.5 shown in FIG. 5 at 12;

disparite thickness, lubricant zones 13 and 14 overlying the media disk 1 including a relative thicker layer 13a of lubricant overlying the normal, head landing zone 2 which, as shown in FIG. 3, may be about 26 angstroms thick, and a relatively thinner lubricant layer 14a overlying the data zone 4 which, as shown in FIG. 3 may be about 15–17 angstroms thick.

In this improvement, the coefficient of friction of lubricant in the relatively thinner lubricant layer 14a overlying the data zone 4 is less than would result from providing a uniform thickness of lubricant extending radially outwardly from the normal, head landing zone 2 and having the same thickness as lubricant overlying this normal landing zone. This improvement is illustrated with different substrate material disks in FIGS. 4 and 5.

In FIG. 4, with an NiP/AL substrate, the improvement is shown to be on the order of about 25% or more when comparing the constant thickness lube layer extension 15 (coefficient of friction of about 1.3) with the thinned and buffed data area lubricant (shown at 11), treated according to this invention and having an enhanced coefficient of friction of about 0.9. In FIG. 5, where a glass substrate is involved, the improvement is on the order of about 50% or more, comparing the thin, data area lubricant, coefficient of friction level 12 (about 0.5) with the unthinned prior art level 16 of approximately 1. In FIG. 5, graph comparison 17 shows a generally similar ratio of improvement at a radially inward area.

The lubricant layer 14a overlying the data zone 4 was formed by initially applying a relatively thick lubricant layer overlying the data zone 4. This lubricant may comprise a perfluoropolyether base lubricant, i.e., a conventional, commonly used disk lubricant.

This initially applied, relatively thick lubricant layer overlying the data zone 4 is subjected to lubricant material removing and lubricant layer thinning, in cooperation with retention and buffing of a fractional thickness increment of the initially applied lubricant overlying the data zone. Such may be accomplished with solvent laden webs or rollers brought into pressing engagement with a rotating disk 1.

The retained and buffed, fractional lubricant increment resulting from this treatment both enhances corrosion resistance of the media disk and reduces the coefficient of friction in the data zone 4.

Generally, a lubricant transition zone 16 is provided, having a lubricant thickness measured generally parallel to the axis of rotation "A" of the media disk which generally decreases in a radially outward direction and extends between the relatively thicker layer 13a of lubricant overlying the normal, head landing zone and the relatively thinner lubricant layer 14a overlying the data zone. (See FIG. 3 in this connection)

The fabrication and production of an enhanced disk of this nature is accomplished through a method entailing the basic manipulative steps as follows:

This method is directed to enhancing the performance of a magnetic media disk having, as shown in FIG. 1 a normal, head landing zone 2 located in an inner diameter area 3, and a data zone 4 located radially outwardly of the normal, head landing zone 2 in an outer diameter area 5.

Figure 2:
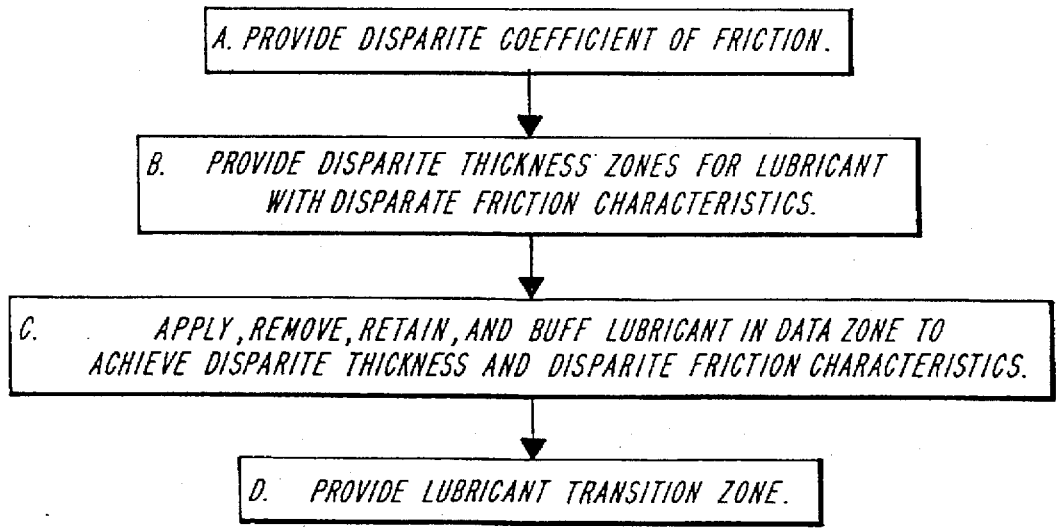

The method improvement of this invention, as shown in FIG. 2, resides in:

A) providing disparite coefficient of friction, surface characteristics for the outer surface of the media disk as shown in FIGS. 4 and 5 including a relatively low coefficient of friction in the normal, head landing zone, and a relatively higher coefficient of friction in the data zone;

B) providing disparite thickness, lubricant zones overlying the media disk as shown in FIG. 3 including a relatively thicker layer of lubricant overlying the normal, head landing zone, and a relatively thinner lubricant layer overlying the data zone;

the coefficient of friction of lubricant in the relatively thinner lubricant layer overlying the data zone, as shown in FIGS. 4 and 5, being less than would result from providing a uniform thickness of lubricant extending radially outwardly from the normal, head landing zone and having the same thickness as lubricant overlying the normal landing zone;

C) forming the lubricant layer overlying the data zone by initially applying a relatively thick lubricant layer overlying the data zone, subjecting the initially applied, relatively thick lubricant layer overlying the data zone to lubricant material removing and lubricant layer thinning, and retention and buffing of a fractional thickness increment of the initially applied lubricant overlying the data zone;

the retained and buffed, fractional lubricant increment enhancing corrosion resistance of the media disk and reducing the coefficient of friction in the data zone; and D) providing a lubricant transition zone having, as shown in FIG. 3, a lubricant thickness measured generally parallel to the axis of rotation of the media disk which generally decreases in a radially outward direction and extends between said relatively thicker layer of lubricant overlying the normal, head landing zone and the relatively thinner lubricant layer overlying the data zone.

DETAIL PARAMETERS OF INVENTION

In practicing the basic method invention summarized in the "Overview" section, specific enhancements parameters are achieved as follows:

First, a method for manufacturing a magnetic media disk is provided wherein the thickness of lubricant in the data zone is maintained at not less than about fifteen angstroms and not more than about twenty angstroms.

Second, a method for manufacturing a magnetic media disk is presented wherein the media disk is textured in the normal, head landing zone. This texturing is operable to tend to stabilize the location of the relatively thicker layer of lubricant overlying the normal, head landing zone. Such may be accomplished using Sputter Induced Micro Texturing (SIMT) and/or etching induced texturing, for example, as described in Applicant's co-pending applications as follows:

| TITLE | INVENTORS | Ser. No. | FILING DATE |
|---|---|---|---|
| Enhanced Methods And Appratus For Producing Micro-Textured, Thin Film, Magnetic Disc Media And Compositely Micro-Textured Disc Media Produced Thereby | Teng, Eltoukhy, Clark, Goh | 08/275,969 | July 15, 1994 |
| Sputter Induced, Micro-Texturing Of Thin Film, Magnetic Disc Media | Teng, Nguyen, Eltoukhy | 08/296,958 | August 26, 1994 |

The disclosures of these co-pending applications are herein incorporated by reference.

Third, a method for manufacturing a magnetic media disk is afforded in which the coefficient of friction of lubricant material in the retained and buffed fractional lubricant increment is reduced by at least about one-fourth of what the coefficient of friction therein would have been without the foresaid lubricant material thinning and buffing.

In the aggregate, and as applied to smooth substrate disks (i.e., glass, etc.) the method of this invention is enhanced in collectively providing that:

the thickness of lubricant in the data zone 4 is maintained at not less than about fifteen angstroms and not more than about twenty angstroms;

the media disk is textured in the normal, head landing zone 2, this texturing being operable to tend to stabilize the location of the relatively thicker layer of lubricant overlying the normal, head landing zone; and the coefficient of friction of lubricant material in the retained and buffed fractional lubricant increment is reduced by about one-half of what the coefficient of friction therein would have been without this lubricant material thinning and buffing, as shown in FIG. 5.

As will be recognized, the coefficient of friction of a disk ordinarily increases in a radially outward direction away from the textured ID zone since, in the ID zone, the coefficient of friction is reduced by providing spaced "peaks" projecting somewhat above the lubricant level. In other words, in the textured ID zone the surface area of head and disk contact is reduced as compared to that existing in the relatively smoother data area of the disk.

All this notwithstanding, the coefficient of friction in the "thinned" OD or data area is reduced through this present invention from what it normally would have been because of chemical solvent application and mechanical buffing effects resulting from the substantial removal of the bulk of lubricant initially applied as herein before described.

Lubricant in the OD zone could be removed by a web of lubricant absorbing material which could be continuously replenished. However, it is presently contemplated that a solvent containing rotating roller would be pressed against the OD zone of a rotating disk so as to effect lubricant removal.

By applying solvent such as freon, alcohol, hexane, or PF5060 to a cotton tape or roller or cellulose tape or roller which is pressed against rotated disk, lube may be effective removal from the data zone without affecting the ID zone. Removal of lube depends on parameters such as solvent type, solvent amount, tape materials, rotating RPM and contact time. The selection of such parameters should be well within the skill level of practioneers in the disk manufacture art, once made aware of this invention.

Further, it is to be recognized that the residual lubricant buffing which inherently results from the practice of this invention is believed to contribute to effective coefficient of friction reduction.

SUMMARY OF PREFERRED EMBODIMENTS IN CONTEXT OF PRODUCED PRODUCT

At this juncture, it is useful and appropriate to summarize the invention in the context of the enhanced disk product produced by the present invention.

As depicted in FIG. 1, this disk product may be viewed as entailing a magnetic media disk 1 having a normal, head landing zone 2 located in an inner diameter area 3, and a data zone 4 located radially outwardly of the normal, head landing zone 2 in an outer diameter area 5. Disparite coefficient of friction, surface characteristics are provided for the outer surface of this media disk and including a relatively low coefficient of friction in the normal, head landing zone 2, and a relatively higher coefficient of friction in the data zone 4.

Disparite thickness, lubricant zones overlying the media disk include a relatively thicker layer 13a of lubricant overlying the normal, head landing zone, and a relatively thinner lubricant layer 14a overlying the data zone. The coefficient of friction of lubricant in the relatively thinner lubricant layer overlying the data zone is less than would result from providing a uniform thickness of lubricant extending radially outwardly from the normal, head landing zone and having the same thickness as lubricant overlying this normal landing zone, as depicted by way of example in FIGS. 4 and 5.

The lubricant layer overlying the data zone is formed by initially applying a relatively thick lubricant layer overlying the data zone, and then subjecting this initially applied, relatively thick lubricant layer overlying the data zone to (a)

lubricant material removing and lubricant layer thinning, and (b) retention and buffing of a fractional thickness increment of the initially applied lubricant overlying the data zone.

The retained and buffed, fractional lubricant increment enhances corrosion resistance of the media disk and reduces the coefficient of friction in said data zone.

Finally, a lubricant transition zone 16 is provided which has a lubricant thickness measured generally parallel to the axis of rotation of the media disk which generally decreases in a radially outward direction and extends between the relatively thicker layer of lubricant overlying the normal, head landing zone and the relatively thinner lubricant layer overlying said data zone. (See FIG. 3, for example.)

Optimally the magnetic media disk is characterized by the thickness of lubricant in the data zone being not less than about fifteen angstroms and not more than about twenty angstroms;

the media disk being textured in the normal, head landing zone, with this texturing being operable to tend to stabilize the location of the relatively thicker layer of lubricant overlying the normal, head landing zone; and the coefficient of friction of lubricant material in the retained and buffed fractional lubricant increment being about one-half of what the coefficient of friction therein would have been without the above described lubricant material thinning and buffing, as shown, for example, in FIG. 5.

SUMMARY OF MAJOR ADVANTAGES, NON OBVIOUSNESS AND OVERALL SCOPE OF INVENTION

Through the present invention a technique is presented for enhancing lubricated characteristics of thin film disk media in the data area while retaining desirable characteristics in the head landing zone. This technique makes effective utilization of existing, relatively uncomplicated lubricant applying techniques. By effectively modifying lubricant in the data area or OD zone of the disk, the coefficient of friction in this area is effectively reduced so as to minimize or substantially reduce stiction problems.

All this is believed to be accomplished through the combined interaction of the lubricant transition zone and the thinned, buffed lubricant layer in the OD or data area. These factors collectively tend to avoid the prior art problems entailed by lubricant migration from the ID area radially outwardly of the disk which resulted in undesired lubricant build-up. Such a build-up, in being avoided and/or minimized through this invention, markedly reduces stiction or head movement impeding problems in the data zone.

At the outset of this presentation, the invention was described in the context of presently known prior art, demonstrating the departure of the invention from the teachings of this prior art, and thus the non-obviousness of the invention.

In practicing the invention, those skilled in the art and familiar with the present disclosure may well recognize additions, deletions, substitutions, and other modifications, all falling within the purview of the invention as set forth in the appended claims.

What is claimed is:

1. In a method for manufacturing a magnetic media disk having a normal, head landing zone located in an inner diameter area, and a data zone located radially outwardly of said normal, head landing zone in an outer diameter area;

the improvement comprising:

providing disparate coefficient of friction, surface characteristics for the outer surface of said media disk including a first, coefficient of friction in said normal, head landing zone, and a second, higher coefficient of friction in said data zone;

providing disparite thickness, lubricant zones overlying said media disk including a first layer of lubricant overlying said normal, head landing zone, having a first thickness and a second lubricant layer overlying said data zone having a second, thinner thickness;

the coefficient of friction of lubricant in said second lubricant layer overlying said data zone being less than would result from providing a uniform thickness of lubricant extending radially outwardly from said normal, head landing zone and having the same thickness as lubricant of said first layer overlying said normal landing zone; forming said lubricant layer overlying said data zone by initially applying a thick lubricant layer overlying said data zone, subjecting said initially applied thick lubricant layer overlying said data zone to lubricant material removing and lubricant layer thinning, and retention and buffing of a fractional thickness increment of said initially applied lubricant overlying said data zone;

said retained and buffed, fractional lubricant increment enhancing corrosion resistance of said media disk and reducing the coefficient of friction in said data zone; and providing a lubricant transition zone having a lubricant thickness measured generally parallel to the axis of rotation of said media disk which generally decreases in a radially outward direction and extends between said first, thicker layer of lubricant overlying said normal, head landing zone and said second, thinner lubricant layer overlying said data zone;

the thickness of lubricant in said data zone is maintained at not less than about ten angstroms and not more than about twenty-five angstroms;

said media disk is textured in said normal, head landing zone, said texturing being operable to tend to stabilize the location of said relatively thicker layer of lubricant overlying said normal, head landing zone; and the coefficient of friction of lubricant material in said retained and buffed fractional lubricant increment is reduced by about one-half of what the coefficient of friction therein would have been without said lubricant material thinning and buffing.

2. In a magnetic media disk having a normal, head landing zone located in an inner diameter area, and a data zone located radially outwardly of aid normal, head landing zone in an outer diameter area;

the improvement comprising:

disparite coefficient of friction, surface characteristics provided for the outer surface of said media disk including a first, low coefficient of friction in said normal, head landing zone, and a second, higher coefficient of friction in said data zone;

disparate thickness, lubricant zones overlying said media disk including
- a first layer of lubricant overlying said normal, head landing zone having a first thickness, and
- a second lubricant layer overlying said data zone having a second, thinner thickness;

the coefficient of friction of lubricant in said second lubricant layer overlying said data zone being less than would result from providing a uniform thickness of lubricant extending radially outwardly from said normal, head landing zone and having the same thickness as lubricant of said first layer overlying said normal landing zone;

said lubricant layer overlying said data zone being formed by
- initially applying a thick lubricant layer overlying said data zone,
- subjecting said initially applied thick lubricant layer overlying said data zone to
  - lubricant material removing and lubricant layer thinning, and
  - retention and buffing of a fractional thickness increment of said initially applied lubricant overlying said data zone;

said retained and buffed, fractional lubricant increment enhancing corrosion resistance of said media disk and reducing the coefficient of friction in said data zone; and a lubricant transition zone having a lubricant thickness measured generally parallel to the axis of rotation of said media disk which generally decreases in a radially outward direction and extends between said first, thicker layer of lubricant overlying said normal, head landing zone and said second, thinner lubricant layer overlying said data zone;

the thickness of lubricant in said data zone is not less than about ten angstroms and not more than about twenty-five angstroms;

said media disk is textured in said normal, head landing zone,
- said texturing being operable to tend to stabilize the location of said relatively thicker layer of lubricant overlying said normal, head landing zone; and the coefficient of friction of lubricant material in said retained and buffed fractional lubricant increment is about one-half of what the coefficient of friction therein would have been without said lubricant material thinning and buffing.

* * * * *